United States Patent
Matsuno et al.

(10) Patent No.: US 7,604,897 B2
(45) Date of Patent: *Oct. 20, 2009

(54) NONAQUEOUS ELECTROLYTE BATTERY HAVING A $LA_3CO_2SN_7$ TYPE CRYSTAL STRUCTURE

(75) Inventors: Shinsuke Matsuno, Kashiwa (JP); Takao Sawa, Yokohama (JP); Yumi Fujita, Yokohama (JP); Tatsuoki Kono, Tokyo (JP); Norio Takami, Yokohama (JP); Fumiyuki Kawashima, Matsudo (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 267 days.

This patent is subject to a terminal disclaimer.

(21) Appl. No.: 11/509,754

(22) Filed: Aug. 25, 2006

(65) Prior Publication Data

US 2007/0054189 A1    Mar. 8, 2007

(30) Foreign Application Priority Data

Sep. 5, 2005    (JP)    ............................ 2005-256035

(51) Int. Cl.
  *H01M 4/58*    (2006.01)
  *H01M 6/16*    (2006.01)
(52) U.S. Cl. ................ 429/218.1; 429/231.6; 429/342; 429/326; 429/231.5
(58) Field of Classification Search ........................ None
See application file for complete search history.

(56) References Cited

U.S. PATENT DOCUMENTS

| | | | | |
|---|---|---|---|---|
| 5,567,539 A | * | 10/1996 | Takahashi et al. | ............. 429/57 |
| 5,916,707 A | * | 6/1999 | Omaru et al. | ............... 429/163 |
| 6,949,312 B1 | * | 9/2005 | Kawakami et al. | ....... 429/218.1 |
| 2003/0134198 A1 | | 7/2003 | Sawa et al. | |
| 2004/0258993 A1 | | 12/2004 | Matsuno et al. | |
| 2005/0214643 A1 | | 9/2005 | Matsuno et al. | |
| 2006/0110659 A1 | | 5/2006 | Matsuno et al. | |

FOREIGN PATENT DOCUMENTS

JP    2006-120324    5/2006

OTHER PUBLICATIONS

U.S. Appl. No. 11/432,402, filed May 12, 2006, Shinsuke Matsuno, et al.
Shinsuke Matsuno, et al., "$La_3Ni_2Sn_7$ Ternary Intermetallic Phase for Lithium Insertion and Deinsertion", Journal of the Electrochemical and Solid-State letters, vol. 8, No. 4, 2005, pp. A234-A236.
Shinsuke Matsuno, et al., "New intermetallic compound for lithium intercalation", The 45th Battery Symposium in Japan, Nov. 27-29, 2004, pp. 294-295 and cover page.
Masayuki Itagaki, et al., "In situ electrochemical impedance spectroscopy to investigate negative electrode of lithium-ion rechargeable batteries", Journal of Power Sources, vol. 135, 2004, pp. 255-261.

* cited by examiner

*Primary Examiner*—Dah-Wei D Yuan
*Assistant Examiner*—Kwang Han
(74) *Attorney, Agent, or Firm*—Oblon, Spivak, McClelland, Maier & Neustadt, P.C.

(57) ABSTRACT

A nonaqueous electrolyte battery includes a positive electrode, a negative electrode and a nonaqueous electrolyte. The negative electrode contains an intermetallic compound having an $La_3Co_2Sn_7$ type crystal structure of which alkaline-earth metal atoms occupy La sites. The nonaqueous electrolyte contains at least one of methyl ethyl carbonate and dimethyl carbonate.

15 Claims, 1 Drawing Sheet

NONAQUEOUS ELECTROLYTE BATTERY HAVING A $La_3Co_2Sn_7$ TYPE CRYSTAL STRUCTURE

CROSS-REFERENCE TO RELATED APPLICATIONS

This application is based upon and claims the benefit of priority from prior Japanese Patent Application No. 2005-256035, filed Sep. 5, 2005, the entire contents of which are incorporated herein by reference.

BACKGROUND OF THE INVENTION

1. Field of the Invention

The present invention relates to a nonaqueous electrolyte battery.

2. Description of the Related Art

A nonaqueous electrolyte battery in which the charging and discharging operations are performed through migration of lithium ions between the negative electrode and the positive electrode, is currently researched and developed as a high energy density battery. It is desired that the negative electrode active material for the nonaqueous electrolyte battery has a high capacity and a long life.

At present, it is a common practice that a carbonaceous material is used for the negative electrode active material. The carbonaceous material has a long life, but a little lithium storage amount, and a capacity of the material are small. To cope with this problem, there is an approach to use alloys or the like for the high-capacity negative electrode active material. However, the volume expansion of the alloy is remarkably large and the life thereof is short because the lithium storing and releasing reaction of the alloy is performed through the alloying reaction.

The inventors of the present patent application disclosed an intermetallic compound having an $La_3Co_2Sn_7$ crystal structure as a negative electrode active material with a high capacity and long life in an article by Shinsuke Matsuno, Tatsuoki Kohno, Norio Takami, Fumiyuki Kawashima, and Takao Sawa, "$La_3Co_2Sn_7$ Ternary Intermetallic Phase for Lithium Insertion and Deinsertion", Electro Chemical and Solid-State Letters, Mar. 1, 2005, 8(4)A234-A236". A capacity of the intermetallic compound per unit volume is two to three times as large as that of the carbonaceous material. The lithium storing/releasing reaction of the intermetallic compound is performed through the reversible lithium insertion reaction. For this reason, a long life of battery is realized by using the intermetallic compound.

BRIEF SUMMARY OF THE INVENTION

According to one aspect of the present invention, there is provided a nonaqueous electrolyte battery comprising:

a negative electrode containing an intermetallic compound having an $La_3Co_2Sn_7$ type crystal structure of which alkaline-earth metal atoms occupy La sites;

a nonaqueous electrolyte containing a solvent consisting of at least one of methyl ethyl carbonate and dimethyl carbonate; and a positive electrode.

DETAILED DESCRIPTION OF THE INVENTION

Figure 1:
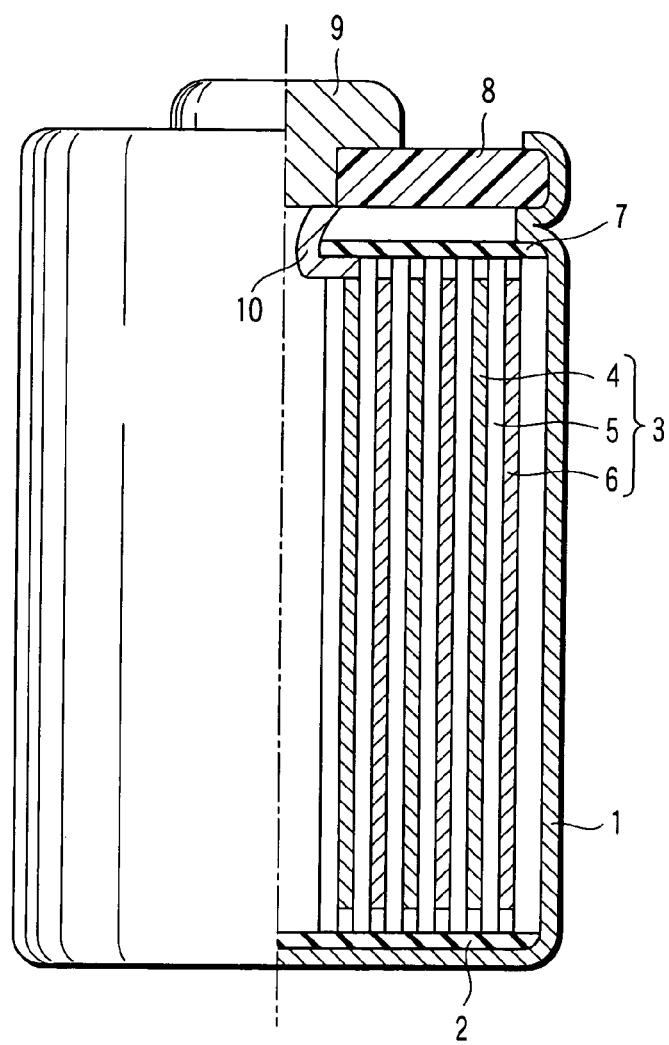
FIG. 1 is a partially cutaway sectional side view showing in model form a cylindrical nonaqueous electrolyte secondary battery according to an embodiment.

The inventors of the present patent application found the following problems, through much research effort.

The intermetallic compound having an $La_3Co_2Sn_7$ type crystal structure has a high surface activity and hence, has a high reactivity with the electrolyte solution. When the reactivity with the electrolyte solution is high, much surface film is formed, and this results in increase of an internal resistance of the battery. This reaction is intensive where an ambient temperature is high and the battery is in a charged state.

Generally, when substitution of various metals is applied to the intermetallic compound, the negative electrode active material could be improved. In the case of the intermetallic compound having the $La_3Co_2Sn_7$ type crystal structure, when alkaline-earth metal atoms occupy a part of the La sites of the crystal structure, it can be expected that the resultant battery capacity is increased. In this case, however, the reactivity with the electrolyte solution is more intensive.

The nonaqueous electrolyte battery according to the embodiment has an excellent high temperature performance.

Embodiment will be described with reference to the accompanying drawings. Throughout the embodiments, like reference symbols are used to designate like or equivalent parts and portions, for simplicity of description. The drawings are model views useful for better understanding of the present invention. The drawings contain some portions where configurations, dimensions, ratios, and others are different from the corresponding ones in an apparatus. Those may be appropriately altered in design by taking into consideration the description to follow, and known technologies.

An outline of the present embodiment will first be described.

A nonaqueous electrolyte battery of the embodiment uses a negative electrode containing an intermetallic compound having an $La_3Co_2Sn_7$ type crystal structure of which alkaline-earth metal atoms occupy La sites, and a nonaqueous electrolyte containing one of methyl ethyl carbonate (MEC) and dimethyl carbonate (DMC).

As stated above, the intermetallic compound having the $La_3Co_2Sn_7$ type crystal structure in which alkaline-earth metal atoms occupy the La sites of the crystal structure can provide high capacity. However, the reactivity with the electrolyte solution is intensive. A reactivity of the nonaqueous electrolyte containing the MEC or the DMC with the intermetallic compound is low. Accordingly, an excellent film is formed on a surface of the negative electrode. This was found to result in improvement of the high temperature performance, such as the high temperature storage performance and the high temperature cycle performance. When comparing with the DEC (diethyl carbonate), which is generally used as the nonaqueous electrolyte in the case of using the intermetallic compound, the effect according to the present embodiment is differ from the effect by the DEC.

An AC impedance measurement was conducted by the inventors. From the measurement, it is found that when a solvent containing DEC is used, the impedance increase at the time of the charging reaction is remarkably large. The phenomenon was analyzed in detail. From the analysis, it was found that the resistance of a surface film formed through the reaction of the nonaqueous electrolyte with the intermetallic compound is large and the resistance value increases with time. On the other hand, it was found that when a nonaqueous solvent containing the MEC or DMC is used, the impedance is small and its value varies little over time.

A little is known about a crystal structure of an intermetallic compound and a reactivity of a constitutive element of the intermetallic compound and a nonaqueous electrolyte. And a reaction between the constitutive element and the nonaqueous electrolyte does not occur uniformly. In the case of the carbonaceous material, in the first charging reaction, the carbonaceous material reacts at the edge part with the nonaqueous electrolyte one time, and the resultant by-product stably covers a surface of the carbonaceous material. In other words, a film is formed on the surface of the carbonaceous material and hence, further side reactions are hard to occur. It is reported that the AC impedance measurement is effective for confirming the reactivity, and the impedance in the charging reaction does not increase to exceed a predetermined value (Journal of Power Sources 135 (2004) 255-261).

A nonaqueous electrolyte battery (for example, cylindrical nonaqueous electrolyte secondary battery) constructed according to the embodiment will be described with reference to FIG. 1.

For example, a bottomed cylindrical container 1 made of stainless includes an insulating member 2 disposed on the bottom of the container. An electrode group 3 is housed in the container 1. The electrode group 3 includes a positive electrode 4, a separator 5 and a negative electrode 6. The positive electrode 4 and the negative electrode 6 are rolled in a state that the separator 5 is interlayered between them and forms the outermost layer of the resultant roll.

The container 1 is filled with a nonaqueous electrolyte. An insulating sheet 7 opened at the center is disposed in the upper part of the electrode group 3 in the container 1. An insulation sealing plate 8 is disposed in an upper opening of the container 1. The insulation sealing plate 8 is fixed to the container 1 by crimping a part of the container 1 close to the upper opening. A positive electrode terminal 9 is fit to the center of the insulation sealing plate 8. A positive electrode lead 10 is connected at one end to the positive electrode 4 and at the other end to the positive electrode terminal 9. The negative electrode 6 is electrically connected to the container 1 as a negative electrode, through a negative electrode lead, not shown.

The negative electrode 6, the positive electrode 4, the nonaqueous electrolyte, the separator 5, and the container 1 will be described in detail hereunder. It is noted that the nonaqueous electrolyte battery according to the embodiment may be applied to the primary battery as well as the secondary battery.

1) Negative Electrode

A negative electrode includes a current collector and a layer containing a negative electrode active material, which are formed on one side or both sides of the current collector. The layer containing the negative electrode active material may be formed in the following manner. A negative mixture containing, for example, a negative electrode active material, a conductive agent and a binder is suspended in an appropriate solvent and mixed to thereby form a coating liquid. Then, the coating liquid is applied to one side or both sides of the current collector, and is dried.

The negative electrode active material contains an intermetallic compound having an $La_3Co_2Sn_7$ type crystal structure in which alkaline-earth metal atoms occupy the La sites of the crystal structure.

Figure 2:
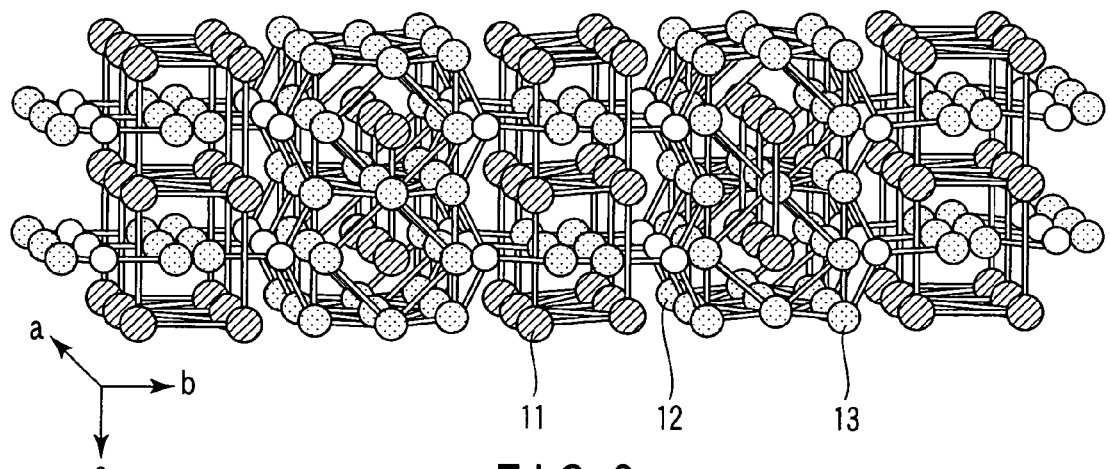
FIG. 2 is a model view showing an $La_3Co_2Sn_7$ type crystal structure.

A model view showing an $La_3Co_2Sn_7$ type crystal structure is shown in FIG. 2. As shown in FIG. 2, atoms 11 in the La sites are hatched by slanted lines; atoms 12 in Co sites are indicated by small white circles; and atoms 13 in Sn sites are indicated by small dotted circles. Lanthanoide atoms (Ln) occupy the La sites. Some of lanthanoide series atoms are substituted by alkaline-earth metal atoms. In the case of the intermetallic compound having the $La_3Co_2Sn_7$ type crystal structure, lithium can be inserted into the crystal structure. Accordingly, it is realized that the cycle performance is stable and the specific volume capacity is high. The substitution of the alkaline earth metal to reduce the molecular weight and the substitution by different kinds of metals to stabilize the cycle performance are effective.

It is preferable that the intermetallic compound having the $La_3Co_2Sn_7$ type crystal structure has a compositional formula expressed by the following formula (1):

$$(M1_xLn_{1-x})_3(M2)_2(M3)_7 \quad (1)$$

Compositions of the La sites are expressed by $M1_xLn_{1-x}$ (where M1 is selected from Ca and Mg, Ln is selected from the lanthanoide series elements, and x is within a range of $0.05 \leqq x \leqq 0.5$). If x is within this range, the effect of the nonaqueous electrolyte containing MEC or DMC is remarkably intensive.

A composition of the Co sites (M2 in the formula (1)) includes at least one kind of element selected from a group consisting of Ti, V, Cr, Mn, Fe, Co, Ni, Cu, Zn and Nb.

A composition of the Sn sites (M3 in the formula (1)) includes at least one kind of element selected from a group consisting of P, Si, Ge, Sn and Sb.

If the compositions of the Co and Sn sites are selected as just mentioned, a coefficient of volume expansion of the intermetallic compound having the $La_3Co_2Sn_7$ type crystal structure can be kept below 50%. Normally, when cracking occurs in the negative electrode active material in the charging reaction, an exposed surface having no film formed thereon is formed. Accordingly, it is difficult to suppress the reaction with the nonaqueous electrolyte. When the coefficient of volume expansion is within the range mentioned above, the cracking hardly occurs, and the cycle performance is enhanced.

It is preferable that Sn atoms occupy the Sn sites.

When Sn atoms occupy the Sn sites, it is easy to retain the $La_3Co_2Sn_7$ type crystal structure with respect to various compositions of M1 and M2. The containing of Sn makes it easy to increase the capacity. The effect to retain the crystal structure is distinguished in particular when the atoms in the La sites are partially substituted by alkaline-earth metal atoms. The percentage of Sn contained in the Sn sites is preferably 50% or higher, more preferably 80% or higher.

Description is given about the atomic ratios of Co and Sn when an atomicity of La is 3.

An atomic ratio of Co is preferably 1.2 or more to 3.5 or less, more preferably 1.5 or more to 3.0 or less.

When the atomic ratio x of Co is more than 3.5, generation of an auxiliary phase other than the $La_3Co_2Sn_7$ type crystal structure increases. When the atomic ratio x of Co is less than 1.2, a phase (e.g., LnSn phase) that reacts with Li for alloying them is generated, so that there is the possibility that the cycle life of the battery is considerably short.

An atomic ratio y of Sn is preferably 6.0 or more to 8.0 or less, more preferably 6.5 or more to 7.8 or less.

When the atomic ratio y of Sn is more than 8.0, a phase (e.g., $Li_{4.4}Sn$ phase) that reacts with Li for alloying them is generated, so that there is the possibility that the cycle life of the battery is considerably short. When the atomic ratio y of Sn is less than 6.0, generation of an auxiliary phase other than the $La_3Co_2Sn_7$ type crystal structure increases.

When the atomicity of La is 3, the intermetallic compound is represented preferably by the following formula (2):

$$(M1_xLn_{1-x})_3Co_aSn_b \quad (2)$$

In the formula, M1 is Ca or Mg, or Ca and Mg. Ln is at least one of lanthanoide series elements. x is within a range of $0.05 \leq x \leq 0.5$. a is within a range of $1.2 \leq a \leq 3.5$. b is within a range of $6 \leq b \leq 8$. More preferable ranges of a and b are: $1.5 \leq a \leq 3$, and $6.5 \leq b \leq 7.8$, respectively.

In a particle diameter distribution of the intermetallic compound having the $La_3Co_2Sn_7$ type crystal structure, the percentage of the particle diameters of 0.1 to 50 μm is preferably 90% or more of all particle diameters, more preferably 95% or more.

If the particles of particle diameter of smaller than 0.1 μm is large in percentage, a contact area of the intermetallic compound with the nonaqueous electrolyte is too large. In this condition, it is difficult to control the reactivity of the intermetallic compound with the nonaqueous electrolyte by specifying the nonaqueous electrolyte or the negative electrode composition. If the particles of particle diameter of more than 50 μm is large, it is difficult to manufacture uniform electrodes in the electrode manufacturing stage. If the particle diameter distribution is as described above, this problem hardly arises.

A percentage of the particles having particle diameters of smaller than 0.1 μm is preferably 10% or less, more preferably 5% or less.

An energy dispersive X-ray fluorescence spectrometer (EDX) using the transmission electron microscope (TEM), a high frequency plasma emission spectrometry (ICP emission spectrometry), fluorescent X-rays emitted by utilizing a radiation light facility, and others may be used for a method for analyzing the alkaline earth metal atoms in the La sites. An EDX analysis using TEM is preferable as a simple analyzing method.

The intermetallic compound having the $La_3Co_2Sn_7$ type crystal structure may be formed by, for examples, high frequency induction heating method, arc heating method, sintering process, rapid solidification process, strip casting process, atomizing process, plating process, CVD process, sputtering process, or rolling process. The rapid solidification process, the strip casting process, the high frequency induction heating method, the atomizing process, and the centrifugal atomizing method are more preferable.

A lithium storage amount can be increased by using a mixture of the intermetallic compound having the $La_3Co_2Sn_7$ type crystal structure and a carbonaceous material having a high lithium absorbing capability for the negative electrode active material. A graphitized material is preferable for the carbonaceous material used as such a negative electrode active material. In this case, a conductive agent to next be described below is preferably used.

A carbonaceous material of high conductivity is used for a conductive agent for increasing an electron conductivity and for reducing a contact resistance with the current collector. Preferable examples of such are acetylene black and carbon black.

Examples of the binders are polytetrafluoroethylene (PTFE), polyvinylidene fluoride (PVdF), fluorine-based rubber, styrene-butadiene rubber (SBR), and carboxymethyl cellulose (CMC).

The compounding ratios of the negative electrode active material, the conductive agent, and the binder are 60 to 95 wt %, 0 to 20 wt %, and 2 to 10 wt %, respectively.

The current collector is made of, for example, copper, stainless steel or nickel, and foil, mesh, punched metal, lath metal or the like may be used for the current collector.

2) Positive Electrode

A positive electrode includes a current collector and a layer containing a positive electrode active material, which are formed on one side or both sides of the current collector.

This positive electrode may be formed in the following manner. A positive electrode active material, a conductive agent and a binder are suspended in an appropriate solvent, and the resultant suspension material is applied to a surface of the current collector, such as an aluminum foil, dried, and pressed.

The positive electrode active material may be any material if it is capable of absorbing and storing lithium at the time of discharging of the battery, and releasing the lithium at the time of charging operation.

Oxides and polymers may be enumerated for the positive electrode active material.

Examples of the oxides are manganese dioxide ($MnO_2$) having stored lithium, iron oxide, copper oxide, nickel oxide, lithium manganese complex oxide (e.g., $Li_xMn_2O_4$ or $Li_xMnO_2$), lithium nickel complex oxide (e.g., $Li_xNiO_2$), lithium cobalt complex oxide (e.g., $Li_xCoO_2$), lithium nickel cobalt complex oxide (e.g., $Li_xNi_{1-y}Co_yO_2$), lithium manganese cobalt complex oxide (e.g., $Li_xMn_yCo_{1-y}O_2$), lithium manganese nickel complex oxide having the spinel structure (e.g., $Li_xMn_{2-y}Ni_yO_4$), lithium phosphorus oxide having the olivine structure (e.g., $Li_xFePO_4$, $Li_xFe_{1-y}Mn_yPO_4$, $Li_xCoPO_4$, etc.), iron sulfate (e.g., $Fe_2(SO_4)_3$,), and vanadium oxide (e.g., $V_2O_5$).

Examples of the polymers are a conductive polymer material, such as polyaniline and polypyrrole, and disulfide polymer material. Additional examples are sulfur (S) and carbon fluoride.

Preferable examples of the positive electrode active materials are lithium manganese complex oxide (e.g., $Li_xMn_2O_4$), lithium nickel complex oxide (e.g., $Li_xNiO_2$), lithium cobalt complex oxide (e.g., $Li_xCoO_2$), lithium nickel cobalt complex oxide (e.g., $Li_xNi_{1-y}Co_yO_2$), lithium manganese nickel complex oxide having the spinel structure (e.g., $Li_xMn_{2-y}Ni_yO_4$), lithium manganese cobalt complex oxide (e.g., $Li_xMn_yCo_{1-y}O_2$), lithium nickel cobalt manganese complex oxide (e.g., $Li_xNi_{1-y-z}Co_yMn_zO_2$), and lithium iron sulfate (e.g., $Li_xFePO_4$). Those positive electrode active materials provide high positive electrode voltage. It is preferable that x, y and z are each within a range from 0 to 1.

Examples of the conductive agents are acetylene black, carbon black, and graphite.

Examples of the binders are polytetrafluoroethylene (PTFE), polyvinylidene fluoride (PVdF) and fluorine-based rubber.

The compounding ratios of the positive electrode active material, the conductive agent, and the binder are 80 to 95 wt %, 3 to 20 wt %, and 2 to 7 wt %, respectively.

The current collector may be made of any material if it is a conductive material. Particularly for the current collector for the positive electrode, a material that is hard to be oxidized at the time of battery reaction is preferable. Examples of such are aluminum, stainless steel and titanium.

3) Nonaqueous Electrolyte

A nonaqueous electrolyte solution formed by dissolving electrolyte into a nonaqueous solvent may be used for the nonaqueous electrolyte. The nonaqueous electrolyte solution can be held with a separator made of a porous material.

A mixture solvent containing at least one of MEC and DMC, and a cyclic ester solvent may be used for the nonaqueous solvent. The cyclic ester may be ethylene carbonate (EC), propylene carbonate (PC) or the like. A halogen element such as F or Cl, instead of H, may be introduced into those nonaqueous solvents in order to increase oxidation resistance and reduction resistance.

The electrolyte may be lithium salt such as lithium perchlorate ($LiClO_4$), lithium hexafluorophosphate ($LiPF_6$), lithium tetrafluoroborate (LiBF$_4$), lithium hexafluorophosphate (LiAsF$_6$), lithium trifluoromethasulfonate (LiCF$_3$SO$_3$), and bis-trifluoromethyl sulfonylimide lithium [LiN(CF$_3$SO$_2$)$_2$] or a mixture thereof. A preferable material is hard to be oxidized even at high potential, and the most preferable materials are LiBF$_4$ and LiPF$_6$.

It is preferable that the dissolved amount of the electrolyte in the nonaqueous solvent is set at 0.5 to 2 mol/L.

A gelatinous body formed by introducing a nonaqueous electrolyte solution into a polymer material may be used for the nonaqueous electrolyte. A nonaqueous electrolyte layer formed by a gelatinous body alone may be placed between the positive electrode and the negative electrode. Alternatively, a separator holding a gelatinous body may be placed between the positive electrode and the negative electrode.

Examples of the polymer materials used for preparing the gelatinous body are a homopolymers, such as polyacrylonitrile, polyacrylate, polyvinylidene fluoride (PVdF), and polyethylene oxide (PECO), and a copolymer of a monomer of each of those homopolymers and another monomer.

The DMC is the most preferable for the intermetallic compound in which the alkaline earth metal atoms are substituted for Ln in the La sites, and Ni and Sn are used for the Co sites and the Sn sites, respectively.

The MEC is the most preferable for the intermetallic compound in which the atoms forming the La sites, the Co sites or the Sn sites are substituted by another kind of atoms.

20% by volume or larger to 90% by volume or smaller of a solvent containing at least one of MEC and DMC is preferably contained in the nonaqueous electrolyte.

In excess of 90% by volume of the solvent, an electric conductivity of the electrolyte solution may be low, and the battery operation is difficult in low temperature condition. In the case of smaller than 20% by volume, it is difficult to suppress the reactivity of the negative electrode with the electrolyte. A more preferable range of the content of the solvent is 50 to 80% by volume.

It is preferable to use a mixture of the solvent containing the cyclic ester solvent and at least one of MEC and DMC, rather than to use the solvent consisting of MEC or DMC. By using the mixture solvent, the dissociation property of lithium salt and the electric conductivity of the electrolyte solution are improved. It is preferable that the cyclic ester solvent is at least one of ethylene carbonate (EC) and propylene carbonate (PC).

4) Separator

The separator is provided for holding the nonaqueous electrolyte, and for insulating the positive electrode from the negative electrode and vice versa. The separator is made of any insulating material if it includes pores which allow ion migration between the positive and the negative electrodes. Examples of the insulating materials are synthetic resin non-woven fabric, polyethylene porous film, polypropylene porous film.

5) Container 1

In FIG. 2 mentioned above, the container 1 is cylindrical. A shape of the nonaqueous electrolyte secondary battery of the embodiment is not limited to the cylindrical one. The battery may take any of various shapes, including flat, prismatic, cylindrical, coin, button, sheet, and stack shape, and may be a large battery carried on an electric vehicle. The electrode group housed in the battery container may be configured to be of the stack type as well as of the winding type.

It should be understood that the present invention is not limited to examples to be given hereunder, and may variously be modified and changed within the scope of the invention.

<<Relation between Negative Electrode Compositions and Nonaqueous Solvent>>

EXAMPLES 1 TO 17

<Manufacturing of Positive Electrode>

To start with, 2.5 wt % of acetylene black, 3 wt % of graphite, 3.5 wt % of polyvinylidene fluoride (PVdF), and N-methyl pyrrolidine (NMP) solution were added to 91 wt % of lithium-cobalt oxide (LiCoO$_2$) of the positive electrode active material, and mixed to prepare a suspension liquid. The resultant suspension liquid is applied to a current collector of an aluminum foil of 15 μm, dried, and pressed to thereby produce a positive electrode having an electrode density of 3.0 g/cm$^3$.

<Manufacturing of Negative Electrode>

Predetermined amounts of elements were mixed at the atomic ratios shown in Table 1 below, and the resultant was cast by using a high frequency induction furnace. The obtained melt is sprayed onto a BeCu roll rotating at peripheral velocity of 20 m/s, and quenched to thereby obtain powder. The resultant powder was pulverized and classified by a vibration sieving machine to thereby obtain an intermetallic compound having a particle diameter distribution shown in Table 1 below. The obtained intermetallic compounds were analyzed by the X-ray diffraction method. Through the analysis, it was confirmed that all the intermetallic compounds contain the crystal phases having the La$_3$Co$_2$Sn$_7$ type crystal structure.

Then, 5 wt % of graphite of the conductive agent, 3 wt % of acetylene black of the same, 7 wt % of PVdF and an NMP solution were added to 85 wt % of the intermetallic compound powder to thereby obtain a suspension liquid. A current collector formed with a copper foil of 11 μm was coated with the resultant suspension liquid, dried and pressed to there form a negative electrode.

<Manufacturing of Electrode Group>

A positive electrode, a separator of a polyethylene porous film, a negative electrode, and a separator were layered in this order, and then wound with the outermost layer of the negative electrode to thereby manufacture an electrode group.

<Preparation of Nonaqueous Electrolyte solution>

Lithium hexafluorophosphate (LiPF$_6$) of 1 mol/L was dissolved into the nonaqueous solvent to thereby prepare a nonaqueous electrolyte solution. The nonaqueous solvent used in the Examples 3, 7, 9, 11, 12, 14 and 16 was a mixed solvent (denoted as EC, MEC in Table 2) in which ethylene carbonate (EC) and methyl ethyl carbonate (MEC) are mixed at the volume ratio of 1:1. The nonaqueous solvent used in the Examples 1, 2, 4, 5, 6, 8, 10, 13, 15 and 17 was a mixed solvent (denoted as EC, DMC in Table 2) in which ethylene carbonate (EC) and dimethyl carbonate (DMC) are mixed at the volume ratio of 1:1.

The electrode group and the nonaqueous electrolyte solution were put in a bottomed cylindrical container 1 made of stainless, and a cylindrical nonaqueous electrolyte secondary battery shown in FIG. 1 was assembled.

COMPARATIVE EXAMPLES 1 TO 5

A cylindrical nonaqueous electrolyte secondary battery was assembled as in the manner of Example 1 except that a mixed solvent in which ethylene carbonate (EC) and diethyl carbonate (DEC) were mixed (mixture volume ratio=1:1) was used as the nonaqueous solvent.

COMPARATIVE EXAMPLES 6 AND 7

A cylindrical nonaqueous electrolyte secondary battery was assembled as in the manner of Example 1 except that $La_3Ni_2Sn_7$ having the $La_3Co_2Sn_7$ type crystal structure was used for the negative electrode active material, and the nonaqueous solvent shown in Table 2 was used.

COMPARATIVE EXAMPLE 8

A cylindrical nonaqueous electrolyte secondary battery was assembled as in the manner of Example 1 except that Si powder of average particle diameter of 10 μm was used for the negative electrode active material.

COMPARATIVE EXAMPLES 9 AND 10

A cylindrical nonaqueous electrolyte secondary battery was assembled as in the manner of Example 1 except that mesophase pitch-based carbon fiber heat treated at 3250° C. (average fiber diameter=10 μm, average fiber length=25 μm, average layer spacing $d_{002}$=0.3355 nm, and specific surface area by BET method=3 m$^2$/g) was used for the negative electrode active material, and the nonaqueous solvent shown in Table 2 was used.

Tests of the secondary batteries were conducted in which measurement ambient temperature was set at 20° C., and each battery was charged up to 3.8 V at charging current 1.5 A for 3 hours, and then discharged up to 2.8 V at 1.5 A. In the tests, a discharge capacity per unit volume of the negative electrode material was calculated from the initial capacity. The discharge capacity was calculated after the charging and discharging operations are repeated 100 times, and a capacity retention rate at 100 cycle was calculated. After the tests, the secondary battery having fully charged again was stored in a thermostatic oven at 45° C. for one week. After this, the battery was cycle tested 50 times at the same rate. A capacity ratio was calculated when the capacity after 100 cycles before the storage is set at 1. The results of the calculations were tabulated in Table 2.

TABLE 1

| | Composition of negative electrode active material |
|---|---|
| Example 1 | $(Ca_{0.25}Mg_{0.25}La_{0.5})_3Ni_2Sn_7$ |
| Example 2 | $(Ca_{0.05}La_{0.95})_3Ni_2Sn_7$ |
| Example 3 | $(Ca_{0.25}Mg_{0.25}La_{0.5})_3Ni_2Sn_7$ |
| Example 4 | $(Ca_{0.25}La_{0.75})_3Ni_2Sn_7$ |
| Example 4-1 | $(Ca_{0.25}La_{0.75})_3Ni_{1.2}Sn_7$ |
| Example 4-2 | $(Ca_{0.25}La_{0.75})_3Ni_{3.5}Sn_7$ |
| Example 4-3 | $(Ca_{0.25}La_{0.75})_3Ni_2Sn_{6.0}$ |
| Example 4-4 | $(Ca_{0.25}La_{0.75})_3Ni_2Sn_{8.0}$ |
| Example 5 | $(Mg_{0.25}La_{0.75})_3Ni_2Sn_7$ |
| Example 6 | $(Ca_{0.1}Ba_{0.05}Mg_{0.15}Ce_{0.6}La_{0.1})_3Ni_2(Sn_{0.8}Ge_{0.2})_7$ |
| Example 7 | $(Sr_{0.25}Ba_{0.05}Mg_{0.2}Ce_{0.2}La_{0.3})_3Ni_2(P_{0.1}Si_{0.1}Sn_{0.8})_7$ |
| Example 8 | $(Ca_{0.25}La_{0.75})_3Ni_2(Sb_{0.05}Sn_{0.95})_7$ |
| Example 9 | $(Ca_{0.25}La_{0.75})_3(Ni_{0.8}Co_{0.2})_2(Sn_{0.8}Ge_{0.2})_7$ |
| Example 10 | $(Ca_{0.3}Nd_{0.7})_3(Ni_{0.3}Ti_{0.3}Fe_{0.4})_2(Sn_{0.95}Sb_{0.05})_7$ |
| Example 11 | $(Mg_{0.3}Nd_{0.7})_3(Ni_{0.5}Zn_{0.3}Cr_{0.2})_2(Sn_{0.95}Si_{0.05})_7$ |
| Example 12 | $(Mg_{0.3}La_{0.7})_3(Ni_{0.5}Zn_{0.3}Mn_{0.2})_2Sn_7$ |
| Example 13 | $(Ca_{0.3}La_{0.7})_3(Ni_{0.7}Nb_{0.1}Mn_{0.2})_2Sn_7$ |
| Example 14 | $(Ca_{0.2}Ce_{0.2}La_{0.3}Nd_{0.5}Sm_{0.1})_3Ni_2(P_{0.05}Sb_{0.1}Sn_{0.85})_7$ |
| Example 15 | $(Ca_{0.2}Ce_{0.2}La_{0.3}Pr_{0.05}Nd_{0.5}Sm_{0.05})_3Ni_2(P_{0.1}Si_{0.1}Sn_{0.8})_7$ |
| Example 16 | $(Ca_{0.5}Ce_{0.1}La_{0.2}Pr_{0.05}Nd_{0.1}Gd_{0.05})_3Ni_2Sn_7$ |
| Example 17 | $(Ca_{0.5}Ce_{0.1}La_{0.1}Pm_{0.05}Nd_{0.2}Gd_{0.05})_3(Ni_{0.8}Fe_{0.1}Cr_{0.1})_2Sn_7$ |
| Comparative Example 1 | $(Ca_{0.25}Mg_{0.25}La_{0.5})_3Ni_2Sn_7$ |
| Comparative Example 2 | $(Ca_{0.25}La_{0.75})_3Ni_2Sn_7$ |
| Comparative Example 3 | $(Ca_{0.1}Ba_{0.05}Mg_{0.15}Ce_{0.6}La_{0.1})_3Ni_2(Sn_{0.8}Ge_{0.2})_7$ |
| Comparative Example 4 | $(Sr_{0.25}Ba_{0.05}Mg_{0.2}Ce_{0.2}La_{0.3})_3Ni_2(P_{0.1}Si_{0.1}Sn_{0.8})_7$ |
| Comparative Example 5 | $(Ca_{0.05}La_{0.95})_3Ni_2Sn_7$ |
| Comparative Example 6 | $La_3Ni_2Sn_7$ |
| Comparative Example 7 | $La_3Ni_2Sn_7$ |
| Comparative Example 8 | Si |
| Comparative Example 9 | C |
| Comparative Example 10 | C |

TABLE 2

| | Percentage of particles having particle diameters of smaller than 0.1 μm | Percentage of particles having particle diameters in the range of 0.1 to 50 μm | Nonaqueous solvent | Negative electrode capacity mAh/cm$^3$ | Capacity retention rate before high temperature (45° C.) storage | Capacity retention rate after high temperature (45° C.) storage |
|---|---|---|---|---|---|---|
| Example 1 | 8% | 91.3% | EC, DMC | 1624 | 89% | 86% |
| Example 2 | 3% | 93.3% | EC, DMC | 1232 | 92% | 85% |
| Example 3 | 1% | 95.4% | EC, MEC | 1598 | 86% | 80% |
| Example 4 | 2% | 95.3% | EC, DMC | 1256 | 90% | 85% |
| Example 4-1 | 3% | 95.2% | EC, DMC | 1632 | 83% | 79% |
| Example 4-2 | 4% | 95.6% | EC, DMC | 1053 | 94% | 88% |
| Example 4-3 | 1% | 96.7% | EC, DMC | 1110 | 93% | 87% |
| Example 4-4 | 2% | 95.6% | EC, DMC | 1690 | 81% | 75% |
| Example 5 | 2% | 94.5% | EC, DMC | 1432 | 86% | 80% |
| Example 6 | 4% | 94.6% | EC, DMC | 1125 | 89% | 87% |
| Example 7 | 3% | 95.6% | EC, MEC | 1324 | 92% | 86% |
| Example 8 | 2% | 94.5% | EC, DMC | 1358 | 93% | 81% |

TABLE 2-continued

|  | Percentage of particles having particle diameters of smaller than 0.1 μm | Percentage of particles having particle diameters in the range of 0.1 to 50 μm | Nonaqueous solvent | Negative electrode capacity mAh/cm$^3$ | Capacity retention rate before high temperature (45° C.) storage | Capacity retention rate after high temperature (45° C.) storage |
|---|---|---|---|---|---|---|
| Example 9 | 3% | 93.5% | EC, MEC | 1265 | 92% | 85% |
| Example 10 | 2% | 95.7% | EC, DMC | 1329 | 89% | 89% |
| Example 11 | 2% | 95.9% | EC, MEC | 1510 | 86% | 83% |
| Example 12 | 3% | 95.4% | EC, MEC | 1532 | 88% | 84% |
| Example 13 | 1% | 93.5% | EC, DMC | 1325 | 90% | 85% |
| Example 14 | 7% | 92.6% | EC, MEC | 1210 | 93% | 80% |
| Example 15 | 2% | 94.8% | EC, DMC | 1134 | 93% | 83% |
| Example 16 | 1% | 98.9% | EC, MEC | 1610 | 87% | 83% |
| Example 17 | 2% | 97.6% | EC, DMC | 1501 | 90% | 85% |
| Comparative Example 1 | 2% | 97.5% | EC, DEC | 1590 | 86% | 45% |
| Comparative Example 2 | 2% | 97.6% | EC, DEC | 1270 | 90% | 44% |
| Comparative Example 3 | 3% | 96.5% | EC, DEC | 1120 | 87% | 53% |
| Comparative Example 4 | 2% | 97.5% | EC, DEC | 1322 | 90% | 51% |
| Comparative Example 5 | 1% | 97.5% | EC, DEC | 1212 | 90% | 65% |
| Comparative Example 6 | 5% | 94.4% | EC, DEC | 1020 | 93% | 84% |
| Comparative Example 7 | 2% | 95.6% | EC, DMC | 1026 | 94% | 85% |
| Comparative Example 8 | — | — | EC, DMC | 9800 | 31% | 15% |
| Comparative Example 9 | — | — | EC, DEC | 545 | 97% | 94% |
| Comparative Example 10 | — | — | EC, DMC | 546 | 96% | 92% |

As seen from Tables 1 and 2, the cycle performances of Examples 1 to 17 before the high temperature storage are comparable to those of Comparative Examples 1 to 5, but the former is superior to the latter in the cycle performance of the battery after the high temperature storage. From this, it can be seen that the nonaqueous electrolyte battery according to the embodiment has an excellent high temperature performance.

A negative electrode capacity of Comparative Example 5 is larger than that of Comparative Example 6, but the cycle performance after the high temperature storage of the former is inferior to that of the latter. Accordingly, it can be seen that when x is 0.05 or higher in the formula (1), the reaction with the nonaqueous solvent resulting from the substitution of La by the alkaline-earth metal atom is intensive.

For Comparative Examples 6 to 7 and Comparative Examples 9 to 10, which are different only in that the nonaqueous solvent is DEC or DMC, no superiority difference was observed on the cycle performance after the storage. From this, it would be surmised that the improvement of high temperature performance owing to use of DMC or MEC would be obtained by using the intermetallic compound having the La$_3$Co$_2$Sn$_7$ type crystal structure of which alkaline-earth metal atoms occupy the La sites.

Further, it would be surmised from the results shown in Examples 6 to 17 that which one of MEC or DMC is preferable depends on the negative electrode active material composition.

<<Particle Size Distribution of Negative Electrode Active Material>>

EXAMPLES 18 TO 22

A negative electrode active material having a particle diameter distribution shown in Table 3 was obtained by classifying the negative electrode composition of Example 1 (see Table 1) by a vibration sieving machine. Except this, a cylindrical nonaqueous electrolyte secondary battery was assembled as in the manner of Example 1.

The laser diffraction type distribution measurement instrument (SALD-300 manufactured by Shimazu) was used for measuring a particle diameter distribution of the negative electrode active material obtained. To be more exact, a test piece of about 0.05 g, surface-active agent, and distilled water of 1 to 2 mL were put into a beaker, sufficiently agitated, and then poured into a agitating bath. A luminous intensity distribution was measured 64 times at intervals of 2 seconds, and the particle diameter distribution data was analyzed.

Tests of the secondary batteries were conducted in which measurement ambient temperature was set at 20° C., and each battery was charged up to 4.0 V at charging current 1.0 A for 3 hours, and then discharged up to 2.8 V at 1.0 A. In the tests, a discharge capacity per unit volume of the negative electrode material was calculated from the initial capacity. The discharge capacity was calculated after the charging and discharging operations are repeated 100 times, and a capacity retention rate at 100 cycle was calculated. After the tests, the secondary battery having fully charged again was stored in a thermostatic oven at 55° C. for one week. After this, the battery was cycle tested 50 times at the same rate. A capacity ratio was calculated when the capacity after 100 cycles before the storage is set at 1. The results of the calculations were tabulated in Table 3.

TABLE 3

| | Composition of negative electrode active material | Nonaqueous solvent | Percentage of particles having particle diameters of smaller than 0.1 μm | Percentage of particles having particle diameters in the range of 0.1 to 50 μm | Negative electrode capacity mAh/cm$^3$ | Capacity retention rate before high temperature (55° C.) storage | Capacity retention rate after high temperature (55° C.) storage |
|---|---|---|---|---|---|---|---|
| Example 18 | $(Ca_{0.25}Mg_{0.25}La_{0.5})_3Ni_2Sn_7$ | EC, DMC (1:1) | 8% | 90.7% | 1733 | 86% | 82% |
| Example 19 | $(Ca_{0.25}Mg_{0.25}La_{0.5})_3Ni_2Sn_7$ | EC, DMC (1:1) | 3% | 95.3% | 1745 | 92% | 83% |
| Example 20 | $(Ca_{0.25}Mg_{0.25}La_{0.5})_3Ni_2Sn_7$ | EC, DMC (1:1) | 1% | 98.2% | 1752 | 86% | 87% |
| Example 21 | $(Ca_{0.25}Mg_{0.25}La_{0.5})_3Ni_2Sn_7$ | EC, MEC (1:1) | 13% | 80.6% | 1712 | 89% | 63% |
| Example 22 | $(Ca_{0.25}Mg_{0.25}La_{0.5})_3Ni_2Sn_7$ | EC, DMC (1:1) | 15% | 80.6% | 1722 | 92% | 68% |

As seen from the results shown in Table 3, a capacity retention rate of the battery after the high temperature storage in Examples 18 to 20 is higher than that in Examples 21 to 22. Accordingly, in the particle diameter distribution of the intermetallic compound having the $La_3Co_2Sn_7$ type crystal structure, when the percentage of the particle diameters of 0.1 to 50 μm is 90% or higher, the high temperature performance is further excellent.

<<Mixing Ratio of Nonaqueous Solvent>>

EXAMPLES 23 TO 27

A nonaqueous electrolyte was prepared in a state that a mixing ratio of the nonaqueous solvent is set at a mixing ratio shown in Table 4. Except this, a cylindrical nonaqueous electrolyte secondary battery was manufactured as in the manner of Example 1.

Charging and discharging tests were conducted on the secondary batteries thus manufactured in similar conditions as in Examples 1 to 17.

TABLE 4

| | Compositions of negative electrode active material | Compositions of nonaqueous solvent | Mixing ratios of DMC and MEC in nonaqueous solvent | Negative electrode capacity mAh/cm$^3$ | Capacity retention rate before high temperature (45° C.) storage | Capacity retention rate after high temperature (45° C.) storage |
|---|---|---|---|---|---|---|
| Example 23 | $(Ca_{0.25}Mg_{0.25}La_{0.5})_3Ni_2Sn_7$ | EC, DMC | 20% | 1600 | 89% | 82% |
| Example 24 | $(Ca_{0.25}Mg_{0.25}La_{0.5})_3Ni_2Sn_7$ | EC, DMC | 75% | 1580 | 92% | 89% |
| Example 25 | $(Ca_{0.25}Mg_{0.25}La_{0.5})_3Ni_2Sn_7$ | EC, DMC | 90% | 1598 | 88% | 84% |
| Example 26 | $(Ca_{0.25}Mg_{0.25}La_{0.5})_3Ni_2Sn_7$ | EC, MEC, DMC | 77% (MEC:DMC = 1:1) | 1608 | 90% | 88% |
| Example 27 | $(Ca_{0.25}La_{0.75})_3Ni_2Sn_7$ | EC, MEC, DMC | 77% (MEC:DMC = 1:2) | 1575 | 90% | 89% |

As shown in Table 4, the examples are all excellent in the cycle performances after the high temperature storage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
   a negative electrode containing an intermetallic compound having an $La_3Co_2Sn_7$ type crystal structure of which alkaline-earth metal atoms occupy La sites;
   a nonaqueous electrolyte containing a solvent consisting of at least one of methyl ethyl carbonate and dimethyl carbonate; and
   a positive electrode.

2. The battery according to claim 1, wherein alkaline-earth metal atoms and lanthanoide series atoms occupy the La sites.

3. The battery according to claim 1, wherein
   a composition of the La sites is expressed by the following formula (A):

$$M1_xLn_{1-x} \qquad (A)$$

where M1: Ca or Mg, or Ca and Mg
   Ln: at least one kind of lanthanoide series elements
   x: $0.05 \leq x \leq 0.5$.

4. The battery according to claim 1, wherein a composition of Co sites includes at least one kind of atom selected from a group consisting of Ti, V, Cr, Mn, Fe, Co, Ni, Cu, Zn and Nb.

5. The battery according to claim 1, wherein a composition of Sn sites includes at least one kind of atom selected from a group consisting of P, Si, Ge, Sn and Sb.

6. The battery according to claim 1, wherein the intermetallic compound is expressed by the following formula:

$$(M1_xLn_{1-x})_3(M2)_2(M3)_7 \qquad (1)$$

where M1: Ca or Mg, or Ca and Mg
   Ln: at least one kind of lanthanoide series elements
   M2: at least one kind of element selected from a group consisting of Ti, V, Cr, Mn, Fe, Co, Ni, Cu, Zn and Nb
   M3: at least one kind of element selected from a group consisting of P, Si, Ge, Sn and Sb.

7. The battery according to claim 1, wherein the intermetallic compound is expressed by the following formula:

$$(M1_x Ln_{1-x})_3 Co_a Sn_b \quad (2)$$

where M1: Ca or Mg, or Ca and Mg
Ln: at least one kind of lanthanoide series elements
x: $0.05 \leqq x \leqq 0.5$
a: $1.2 \leqq a \leqq 3.5$
b: $6 \leqq b \leqq 8$.

8. The battery according to claim 7, wherein a is $1.5 \leqq a \leqq 3$, and b is $6.5 \leqq b \leqq 7.8$.

9. The battery according to claim 1, wherein the intermetallic compound has a particle diameter distribution in which a percentage of particle diameters of 0.1 to 50 μm is 90% or higher.

10. The battery according to claim 1, wherein the intermetallic compound has a particle diameter distribution in which a percentage of particle diameters of 0.1 to 50 μm is 90% or more, and a percentage of particle diameters of less than 0.1 μm is 10% or less.

11. The battery according to claim 1, wherein the intermetallic compound has a particle diameter distribution in which a percentage of particle diameters of 0.1 to 50 μm is 90% or more, and a percentage of particle diameters of less than 0.1 μm is 5% or less.

12. The battery according to claim 1, wherein the intermetallic compound has a particle diameter distribution in which a percentage of particle diameters of 0.1 to 50 μm is 95% or more.

13. The battery according to claim 1, wherein a content of the solvent in the nonaqueous electrolyte is a range of 20 to 90% by volume.

14. The battery according to claim 1, wherein a content of the solvent in the nonaqueous electrolyte is a range of 50 to 80% by volume.

15. The battery according to claim 1, wherein the nonaqueous electrolyte further contains at least one of ethylene carbonate and propylene carbonate.

* * * * *